US012637575B2

(12) United States Patent
Jung et al.

(10) Patent No.: US 12,637,575 B2
(45) Date of Patent: May 26, 2026

(54) INK COMPOSITION AND A COATING FILM INCLUDING AN INK LAYER CONTAINING THE HIDDEN-TYPE INK COMPOSITION

(71) Applicants: Hyundai Motor Company, Seoul (KR); Kia Corporation, Seoul (KR)

(72) Inventors: Woo Chul Jung, Bucheon (KR); Min Jin Choi, Bucheon (KR); Choon Ho Lee, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 18/380,891

(22) Filed: Oct. 17, 2023

(65) Prior Publication Data

US 2024/0352263 A1 Oct. 24, 2024

(30) Foreign Application Priority Data

Apr. 19, 2023 (KR) ........................ 10-2023-0051226

(51) Int. Cl.
*C09D 11/037* (2014.01)
*C09D 11/03* (2014.01)
*C09D 11/104* (2014.01)
*C09D 11/107* (2014.01)

(52) U.S. Cl.
CPC ........... *C09D 11/037* (2013.01); *C09D 11/03* (2013.01); *C09D 11/104* (2013.01); *C09D 11/107* (2013.01)

(58) Field of Classification Search
None
See application file for complete search history.

(56) References Cited

U.S. PATENT DOCUMENTS

| | | | |
|---|---|---|---|
| 5,806,957 A | 9/1998 | Prior et al. | |
| 8,752,989 B2 | 6/2014 | Roberts et al. | |
| 10,661,726 B2 | 5/2020 | Schöne et al. | |
| 2015/0316686 A1* | 11/2015 | Vanier | C09C 1/0015 |
| | | | 252/586 |

* cited by examiner

*Primary Examiner* — Cheng Yuan Huang
(74) *Attorney, Agent, or Firm* — Fox Rothschild LLP

(57) ABSTRACT

Provided is an ink composition for implementing a hidden-type emblem or lettering that emits light in an emblem or lettering form by reflecting external light, without having a light source inside the emblem.

20 Claims, 13 Drawing Sheets

INK COMPOSITION AND A COATING FILM INCLUDING AN INK LAYER CONTAINING THE HIDDEN-TYPE INK COMPOSITION

CROSS REFERENCE TO RELATED APPLICATION

The present application claims priority to Korean Patent Application No. 10-2023-0051226, filed Apr. 19, 2023, the entire contents of which is incorporated herein for all purposes by this reference.

TECHNICAL FIELD

The present disclosure relates to an ink composition for implementing a hidden-type emblem or lettering that emits light in an emblem or lettering form by reflecting external light without having a light source inside the emblem.

BACKGROUND

For emblem and lettering parts applied to existing vehicles, surface treatment methods, such as wet chrome plating, are being used to improve aesthetics and visibility. Recently, as electric vehicles and self-driving vehicles have been actively developed, there are growing needs for new types of vehicle emblems. In response to these needs, the development of a variety of light-emitting emblems with lighting specifications is in progress.

A light-emitting emblem has an internal LED light source. With surface treatment, such as film painting, applied to an emblem cover, the emblem or the periphery of the emblem emits light when the light is on. In addition, when the light is off, the surface treatment specifications may be visible or invisible in a hidden type.

SUMMARY

In preferred aspect, provided is a hidden-type emblem or lettering that emits light in an emblem or lettering form by reflecting external light without having a light source inside the emblem. In particular, the emblem or lettering may include an ink composition that includes components reflecting external light in absence of a light source.

In one aspect, an ink composition is provided that may suitably comprise: a) an amount of about 10 wt % to 40 wt % of an acrylic resin; b) an amount of about 5 wt % to 20 wt % of an acrylic polyol resin; c) an amount of about 5 wt % to 20 wt % of a polyester polyol resin; d) an amount of about 2 wt % to 30 wt % of a curing agent; e) an amount of about 20 wt % to 40 wt % of a retro-reflective pigment; f) an amount of about 0.6 wt % to 3 wt % of an additive; based on the total weight of the ink composition. In certain embodiments, the composition is suitably formulated as a fluid composition for example where the ink composition comprise one or more solvents that disperse or dissolve the above components, e.g. where the ink composition comprises an amount of about 5 wt % to 20% of a solvent (one or more solvents) based on the total weight of the ink composition.

In an aspect, provided is an ink composition including an amount of about 10 wt % to 40 wt % of an acrylic resin; an amount of about 5 wt % to 20 wt % of an acrylic polyol resin; an amount of about 5 wt % to 20 wt % of a polyester polyol resin; an amount of about 2 wt % to 30 wt % of a curing agent; an amount of about 20 wt % to 40 wt % of a retro-reflective pigment; an amount of about 0.6 wt % to 3 wt % of an additive; and an amount of about 5 wt % to 20 wt % of one or more solvents solvent, based on the total weight of the ink composition.

The acrylic resin may have a weight average molecular weight (Mw) in a range of about 1,000 g/mol to 15,000 g/mol.

The acrylic resin may have a glass-transition temperature (Tg) in a range of about 5° C. to 10° C. The acrylic polyol resin may have a weight average molecular weight (Mw) in a range of about 1,000 g/mol to 5,000 g/mol.

The acrylic polyol resin may have a hydroxyl value in a range of about 100 mgKOH/g to 150 mgKOH/g.

The polyester polyol resin may have a weight average molecular weight (Mw) in a range of about 2,000 g/mol to 4,000 g/mol.

The polyester polyol resin may have a hydroxyl value in a range of about 100 mgKOH/g to 150 mgKOH/g.

The curing agent may include one or more selected from the group consisting of methylene diphenyl diisocyanate (MIDI), 1,6-hexamethylene diisocyanate (HDI), p-phenylene diisocyanate (PPDI), toluene diisocyanate (TDI), 1,5-naphthalene diisocyanate (NDI), and isophorone diisocyanate (IPDI).

The retro-reflective pigment may include one or more selected from the group consisting of silica ($SiO_2$)-based glass beads, strontium carbonate ($SrCO_3$)-based glass beads, and aluminum oxide ($Al_2CO_3$)-based glass beads.

The retro-reflective pigment may have a spherical form and a diameter in a range of about 30 μm to 200 μm.

The ink composition may further include an amount of about 0.1 wt % to 10 wt % of a color pigment, based on the total weigh of the ink composition.

The additive may include at a UV stabilizer, an anti-settling agent, or combinations thereof.

The additive may include: an amount of about 0.5 wt % to 2 wt % of the UV stabilizer; and an amount of about 0.1 wt % to 1 wt % of the anti-settling agent, based on the total weight of the ink composition.

The solvent suitably may include one or more organic solvents such as those selected from the group consisting of toluene, xylene, methyl ethyl ketone (MEK), methyl isobutyl ketone (MIBK), and butyl acetate, or other materials.

In an aspect, provided is a coating film including: a substrate layer; a primer layer disposed on the substrate layer, a base layer disposed on the primer layer; a clear layer disposed on the base layer; and an ink layer interposed between the base layer and the clear layer.

Alternatively, provided is coating film may include: a substrate layer, a primer layer disposed on the substrate layer, a base layer disposed on the primer layer; a clear layer disposed on the base layer; and the ink layer, as described herein, disposed on the clear layer.

The ink layer may have a thickness in a range of about 1 μm to 5 μm.

The coating film may further include an adhesive layer interposed between the clear layer and the ink layer and a transparent film layer disposed on the ink layer.

Further provided is a vehicle including the coating film as described above.

According to various exemplary embodiments of the present disclosure, the ink composition can provide a lighting effect with an external light source by printing a printed layer containing a retro-reflective pigment on the outside of a vehicle and being integrated with a vehicle skin surface, free of a protruding surface, without supplying external electricity.

Other aspects of the invention are disclosed infra.

DETAILED DESCRIPTION

Figure 1:
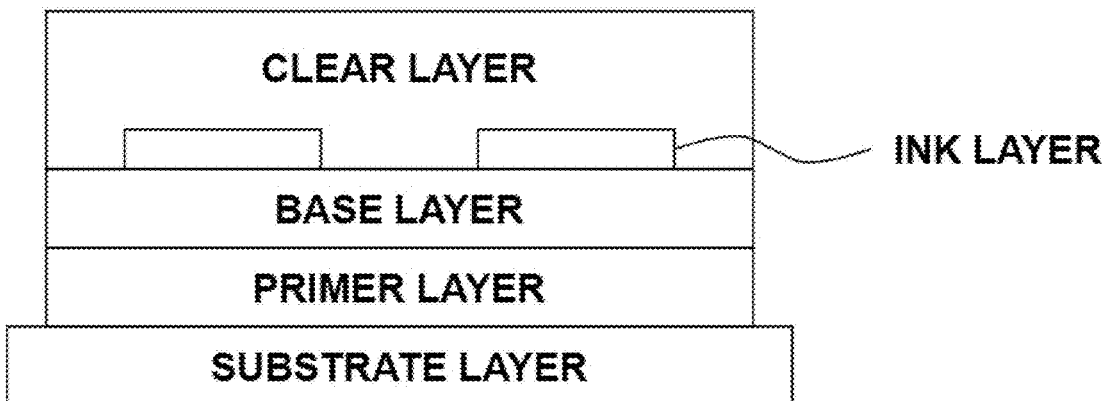
FIG. 1 shows an exemplary coating film according to an exemplary embodiment of the present disclosure.

Above objectives, other objectives, features, and advantages of the present disclosure will be readily understood from the following preferred embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those skilled in the art. Throughout the drawings, like elements are denoted by like reference numerals. In the accompanying drawings, the dimensions of the structures are larger than actual sizes for clarity of the present disclosure. Terms used in the specification, "first", "second", etc., may be used to describe various components, but the components are not to be construed as being limited to the terms. These terms are used only for the purpose of distinguishing a component from another component. For example, without departing from the scope of the present disclosure, a first component may be referred as a second component, and a second component may be also referred to as a first component. As used herein, the singular forms "a", "an", and "the" are intended to include the plural forms as well unless the context clearly indicates otherwise. It will be further understood that the terms "comprises", "includes", or "has" when used in this specification specify the presence of stated features, regions, integers, steps, operations, elements, and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In certain preferred aspects, a vehicle may be electric-powered, including a hybrid vehicles, plug-in hybrids, or vehicles where electric power is the primary or sole power source.

The present disclosure relates to the ink composition constituting an emblem or lettering that reflects external light, without having a light source inside the emblem. The ink composition is included so that an emblem integrated with a vehicle skin can be implemented on the exterior surface of a vehicle (e.g., vehicle body, bumper, and the like) without protrusion in an emblem area.

An existing emblem integrated with a vehicle skin is manufactured by introducing an ink layer on the rear surface of a film, manufacturing the printed film into an emblem cover by sectionalizing the film into an emblem area and a light shielding area, and assembling a lighting module. Since such a manufactured light-emitting emblem is mounted on the outside of the vehicle, the emblem area is clearly distinguishable, so the implementation of a hidden-type emblem is difficult.

The ink layer of the present disclosure is characterized by being printed on the outside of the vehicle, without a lighting module, to implement an emblem type integrated with the vehicle skin surface while emitting light from an external light source.

A term "Retro-reflection" is a reflection in which light from a light source is reflected on the surface of an object and returns to the light source, which may realize an emblem or lettering having a specific form by external light reflection. Without external light, the visibility of the emblem is poor (hidden), and with external light (headlamps of other vehicles, street lights, and the like), the visibility of the emblem is improved due to light reflection.

In an aspect, the ink composition may include an acrylic resin, an acrylic polyol resin, a polyester polyol resin, a curing agent, a retro-reflective pigment, an additive, and a solvent.

Hereinafter, each component of the composition will be described in detail.

(A) Acrylic Resin

The acrylic resin as used herein may have excellent weather resistance and heat resistance, and thus may prevent fading caused by external light or heat and maintain physical properties.

As a monomer, the acrylic resin may include one or more selected from the group consisting of methyl methacrylate, ethyl methacrylate, propyl methacrylate, n-butyl methacrylate, isobutyl methacrylate, tert-butyl methacrylate, 2-ethylhexyl methacrylate, benzyl methacrylate, phenyl methacrylate, stearic methacrylate, cyclohexyl methacrylate, and lauryl methacrylate. The acrylic resin is preferably methyl methacrylate.

The acrylic resin may have a weight average molecular weight (Mw) in a range of about 1,000 g/mol to 15,000 g/mol. When the weight average molecular weight is less than about 1,000 g/mol, heat resistance and weather resistance may deteriorate. On the contrary, when the weight average molecular weight is greater than about 15,000 g/mol, ink viscosity may increase, resulting in poor appearance quality.

The acrylic resin may have a glass-transition temperature (Tg) in a range of about 5° C. to 10° C. When the temperature is greater than about 10° C., deterioration in ink quality, such as ink bleeding and the like, may occur during an ink layer printing operation.

The acrylic resin may be contained in an amount in a range of about 10 wt % to 40 wt % based on the total weight of the ink composition. When its amount is less than about 10 wt %, the physical properties of the coating film, such as weather resistance, heat resistance, and the like, may deteriorate. On the contrary, when its amount is greater than about 40 wt %, viscosity and the hardness of the ink layer may increase during ink layer printing, resulting in cracking of the coating film during product deformation.

(B) Acrylic Polyol Resin

The acrylic polyol resin as used herein may facilitate or promote coating film to be formed by cross-linking with a curing agent, and enables the implementation of a coating film having excellent heat resistance and weather resistance. In addition, the acrylic polyol resin may act to maintain ink viscosity as well as to give an appearance with excellent leveling properties and the like.

The acrylic polyol resin may include one or more selected from the group consisting of 2-hydroxyethyl methacrylate, 2-hydroxyethyl acrylate, 2-hydroxy methacrylate, 2-hydroxypropyl methacrylate, and 2-hydroxypropyl acrylate. The acrylic polyol resin is preferably 2-hydroxy methacrylate.

The acrylic polyol resin may have a weight average molecular weight (Mw) in a range of about 1,000 g/mol to 5,000 g/mol. When the weight average molecular weight is less than about 1,000 g/mol, appearance quality may be deteriorated. On the contrary, when the weight average molecular weight is greater than about 5,000 g/mol, deterioration in the physical properties of the coating film may occur.

The acrylic polyol resin may have a hydroxyl value in a range of about 100 mgKOH/g to 150 mgKOH/g. When the hydroxyl value is less than about 100 mgKOH/g, appearance quality may be poor. On the contrary, when the hydroxyl value is greater than about 150 mgKOH/g, deterioration in the physical properties of the coating film may occur.

The acrylic polyol resin may be contained in an amount in a range of about 5 wt % to 20 wt % based on the total weight of the ink composition. When its amount is less than 5 wt %, appearance quality may be poor. On the contrary, when its amount is greater than about 20 wt %, deterioration in the physical properties of the coating film may occur.

(C) Polyester Polyol Resin

The polyester polyol resin as used herein may provide ductility to the ink layer to provide physical properties, such as impact resistance, resistance bending, and the like, as well as to maintain low ink viscosity.

The polyester polyol resin may be a glycol-based compound, including triethylene glycol, tetraethylene glycol, and the like, or an amine-based compound, including triethanolamine and the like. Alternatively, the polyester polyol resin may contain aromatic aniline as a branched chain.

The polyester polyol resin may have a weight average molecular weight (Mw) in a range of about 2,000 g/mol to 4,000 g/mol. When the weight average molecular weight is less than about 2,000 g/mol, appearance quality may be poor. On the contrary, when the weight average molecular weight is greater than about 4,000 g/mol, deterioration in the physical properties of the coating film may occur.

The polyester polyol resin may have a hydroxyl value in a range of about 100 mgKOH/g to 150 mgKOH/g. When the hydroxyl value is less than about 100 mgKOH/g, the hardness of the coating film may increase due to an over-curing reaction, leading to a decrease in impact resistance. On the contrary, when the hydroxyl value is greater than about 150 mgKOH/g, unreacted resins may lead to a deterioration in durability, such as water resistance, moisture resistance, and the like.

The polyester polyol resin may be contained in an amount in a range of about 5 wt % to 20 wt % based on the total weight of the ink composition. When the amount is less than about 5 wt %, the hardness of the ink layer may increase. Thus, cracking and breakage of the ink layer may occur during an impact test, resulting in poor appearance quality. On the contrary, when the amount is greater than about 20 wt %, deterioration in the physical properties of the coating film, such as heat resistance, weather resistance, and the like, may occur.

(D) Curing Agent

The curing agent as used herein may improve cross-linking density by combining with the acrylic polyol resin or polyester polyol resin.

The curing agent may include one or more selected from the group consisting of methylene diphenyl diisocyanate (MDI), hexamethylene diisocyanate (HDI), p-phenylene diisocyanate (PPDI), toluene diisocyanate (TDI), 1,5-naphthalene diisocyanate (NDI), and isophorone diisocyanate (IPDI). The curing agent is preferably hexamethylene diisocyanate (HDI).

The curing agent may be included in an amount in a range of about 2 wt % to 30 wt % based on the total weight of the ink composition. When its amount is less than about 2 wt %, deterioration in mechanical properties and chemical resistance may occur. On the contrary, when its amount is greater than about 30 wt %, a deterioration in the physical properties of the coating film may occur due to unreacted NCO.

(E) Retro-Reflective Pigment

The retro-reflective pigment may suitably include silica ($SiO_2$)-based, strontium carbonate ($SrCO_3$)-based glass, or aluminum oxide ($Al_2CO_3$)-based glass beads, and is preferably silica-based glass beads. The silica-based glass beads have the advantage of being able to implement various sizes and colors.

The retro-reflective pigment may have a spherical form and a diameter in a range of about 30 μm to 200 μm, for example, in a range of about 30 μm to 100 μm. When the diameter is less than about 30 μm, appearance quality may be uniform, but visibility may be poor. On the contrary, when the diameter is greater than about 200 μm, visibility may be improved, but exterior stains may occur. The larger the particle diameter, the better the retro-reflective performance, which is advantageous. On the other hand, when the particle diameter increases, the weight of the particles increases, and the amount of pigment contained in the resins becomes small. As a result, the particles may fail to be uniformly applied to the entire ink layer, which may look like surface stains, and print quality thus may be poor.

The retro-reflective pigment may be contained in an amount in a range of about 30 wt % to 40 wt % based on the total weight of the ink composition. When its amount is less than about 30 wt %, the amount of light reflection may be insufficient, resulting in poor visibility and appearance quality. On the contrary, when its amount is greater than about 40 wt %, the printing adhesive strength of the ink layer may be reduced.

A color pigment may be further contained in the ink composition to implement a color similar to that of a base paint used for the exterior parts. In the case of using silica-based glass beads as the retro-reflective pigment, both color implementation and reflective performance are excellent.

The ink of the present disclosure may be transparent, but may further contain a color pigment as same as the vehicle color to implement a color similar to the exterior color of the vehicle.

The amount of the color pigment being applied varies depending on the color of the vehicle body, so the amount is not limited. However, the color pigment may be contained, for example, in an amount in a range of about 0.1 wt % to 10 wt % based on the total weight of the ink composition.

(F) Additive

The additive may include a UV stabilizer, an anti-settling agent, or combinations thereof.

The UV stabilizer, used to meet the weather resistance of the ink layer, absorbs UV light in the sunlight to serve to prevent discoloration (yellowing), cracking, and the like of the ink layer.

Any UV stabilizers commonly used are available, and examples thereof may include benzotriazole-based, benzophenone-based, and amine-based stabilizer stabilizers.

The UV stabilizer may be included in an amount in a range of about 0.5 wt % to 2 wt % based on the total weight of the ink composition. When the amount is less than about 0.5 wt %, the effect of preventing discoloration, cracking, and the like of the ink layer may be reduced.

The anti-settling agent may improve the dispersion, flowability, and storage stability of the pigment.

Any anti-settling agents commonly used are available, and examples thereof may include acetate-based, polyester-based, and polyethylene-based anti-settling agents.

The anti-settling agent may be included in an amount in a range of about 0.1 wt % to 1 wt % based on the total weight of the ink composition. When the amount is less than about 0.1 wt %, storage stability may be reduced due to pigment precipitation.

In addition, when the anti-settling agent is included, the storage stability may be improved. However, when the diameter of the pigment increases, the weight of the pigment increases, so such an improvement effect may fail to be obtained. In addition, the amounts of the resins decrease when the amount of the pigment increases, so the effect of the anti-settling agent may be reduced.

(G) Solvent

The solvent can disperse the resins and the pigment as well as to adjust viscosity.

The solvent may suitably include one or more organic solvents or non-organic solvents. Organic solvents may be particularly suitably such as one or more selected from the group consisting of toluene, xylene, methyl ethyl ketone (MEK), methyl isobutyl ketone, and butyl acetate, and other materials. The solvent may be, for example, a mixed solvent containing toluene and xylene.

The solvent suitably may be contained in an amount in a range of about 5 wt % to 20 wt % based on the total weight of the ink composition. When the amount is less than about 5 wt %, an increase in viscosity and a decrease in the dispersibility of the resins and the pigment may result in non-transfer, thereby deteriorating printability. On the contrary, when the amount is greater than about 20 wt %, due to a decrease in viscosity, a desired thickness may be difficult to be obtained during printing. In addition, deterioration in print quality (print bleeding) may occur.

In another aspect, the present disclosure relates to a coating film including (or formed of) the ink composition described above. The coating film may enable the implementation of a hidden-type emblem or lettering that emits light in an emblem or lettering form by reflecting external light, without having a light source inside the emblem. In particular, the coating film may include an ink layer containing the retro-reflective pigment on the surface of a base layer having the color of the vehicle while having transparent color, the vehicle color, or the same color as the base layer. As a result, the ink layer becomes invisible in a place where there is no external light or in a dark place while the light is reflected from the ink layer when light illuminates from other vehicles. Therefore, an emblem type integrated with the vehicle skin surface, free of a protruding surface, as well as a lighting effect by an external light source are implementable.

FIG. 1 shows a coating film according to an exemplary embodiment of the present disclosure. For example, the coating film is characterized by including a substrate layer, a primer layer disposed on the substrate layer, a base layer disposed on the primer layer, a clear layer disposed on the base layer, and an ink layer interposed between the base layer and the clear layer.

Figure 2A:
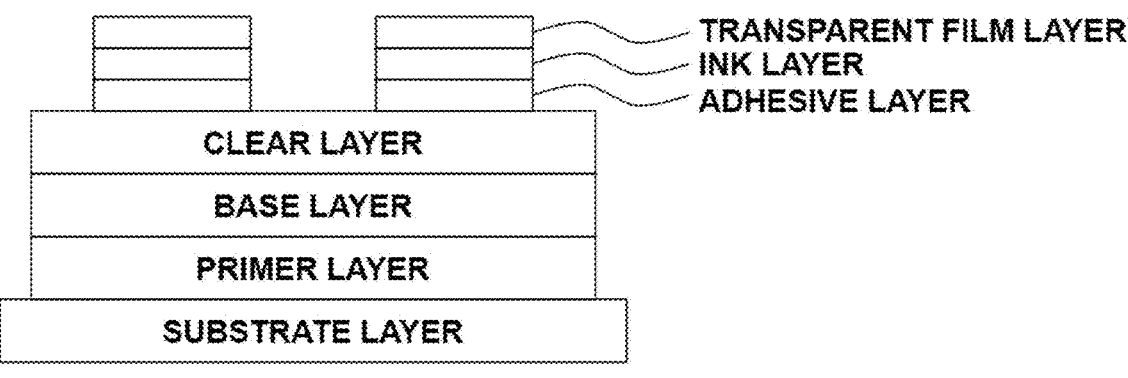
FIG. 2A shows an exemplary coating film according to an exemplary embodiment of the present disclosure.

FIG. 2A shows a coating film according to an exemplary embodiment of the present disclosure. For example, the coating film is characterized by including: a substrate layer; a primer layer disposed on the substrate layer, a base layer disposed on the primer layer; a clear layer disposed on the base layer; and an ink layer disposed between the base layer and the clear layer. In addition, the coating film may further include an adhesive layer interposed between the clear layer and the ink layer and a transparent film layer disposed on the ink layer.

The ink layer may include the ink composition described above, so the description of the ink composition is omitted, as described above.

The ink layer may have a thickness in a range of about 1 μm to 5 μm. The ink layer is not mounted as a separate object as in existing emblems having a thickness in a range of about 2 mm to 3 mm and is thus characterized by not being protruded from the painted surface. In addition, the ink layer may do not include a separate lighting module as in the existing emblems and thus may enable the implementation of the emblem type integrated with the vehicle skin surface.

Figure 2B:
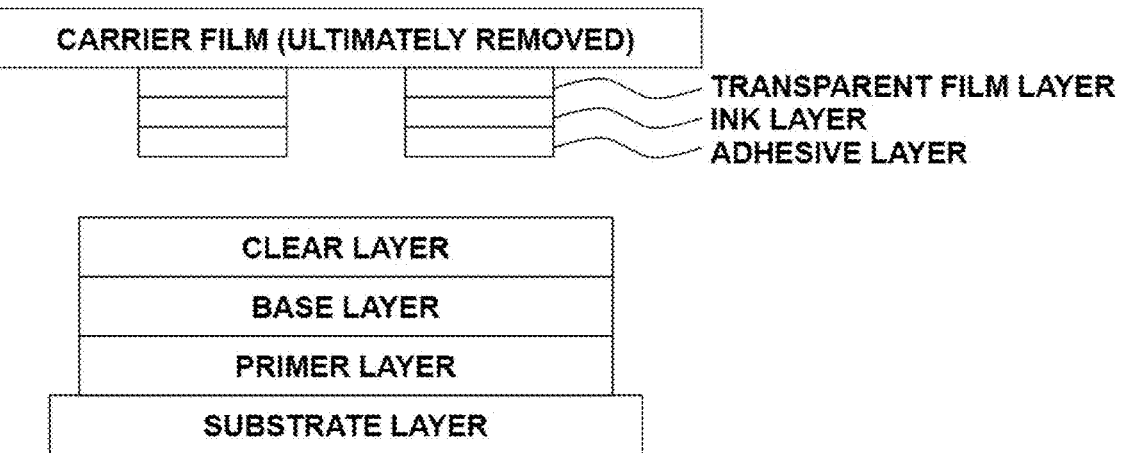
FIG. 2B shows an exemplary process of producing an exemplary coating film according to an exemplary embodiment of the present disclosure.
Figure 3:
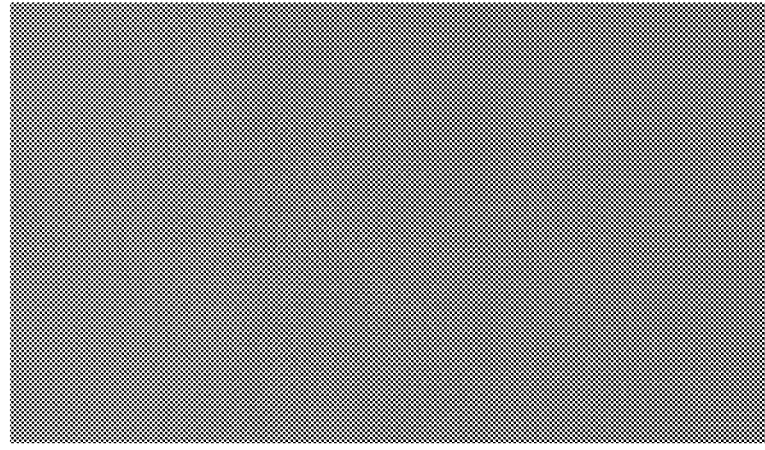
FIG. 3 shows a printability test result of Example 1 of the present disclosure.
Figure 4:
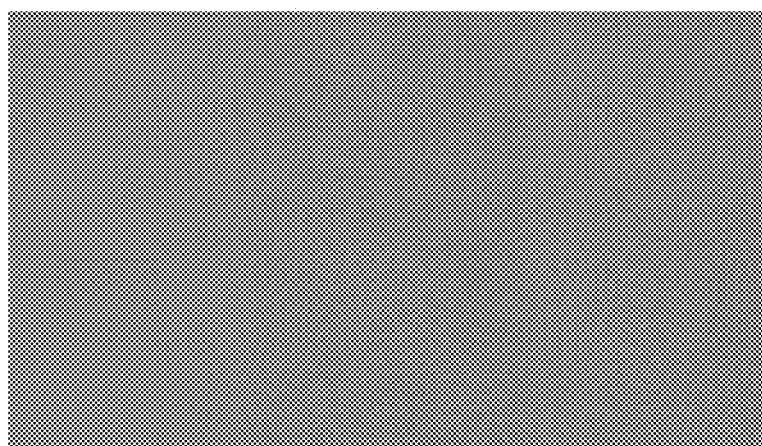
FIG. 4 shows a printability test result of Example 2 of the present disclosure.
Figure 5:
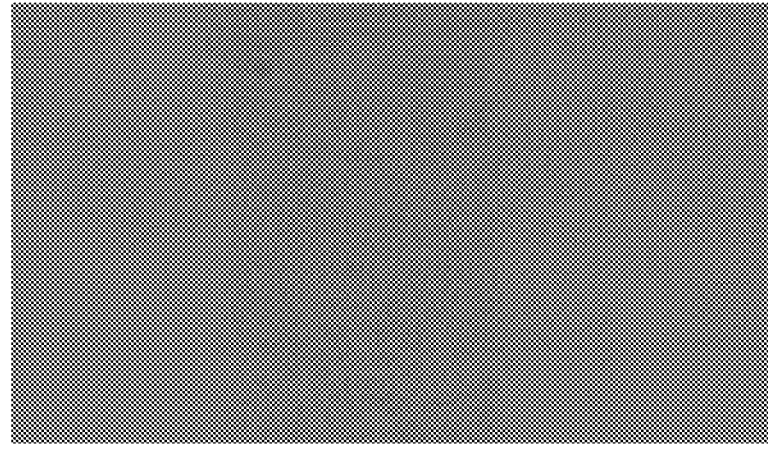
FIG. 5 shows a printability test result of Example 3 of the present disclosure.
Figure 6:
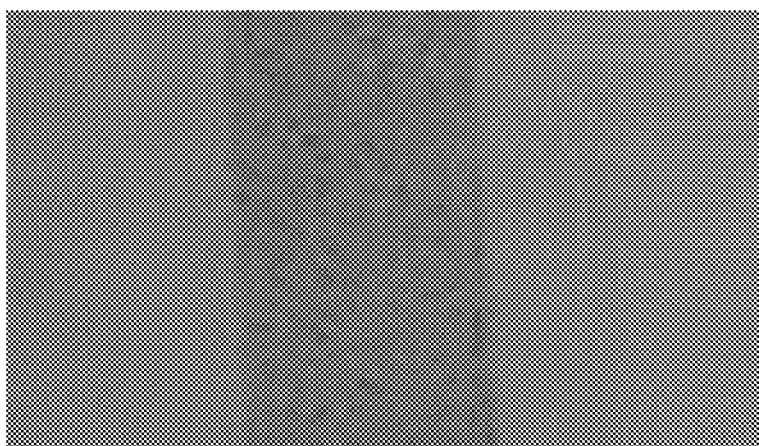
FIG. 6 shows a printability test result of Example 4 of the present disclosure.
Figure 7:
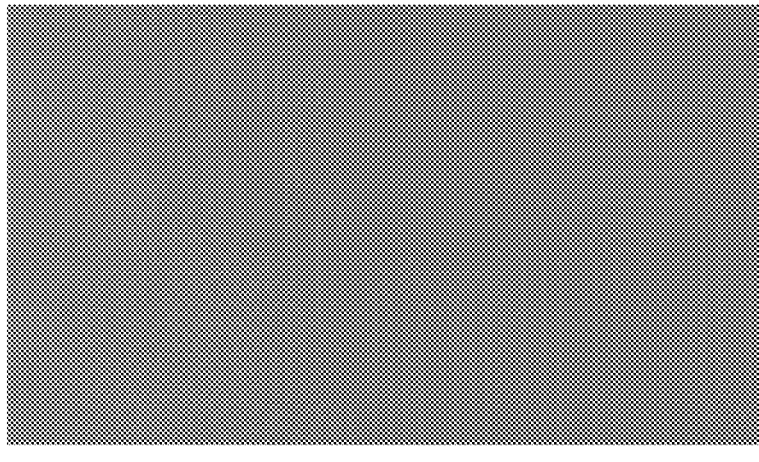
FIG. 7 shows a reflective performance test result of Example 1 of the present disclosure.
Figure 8:
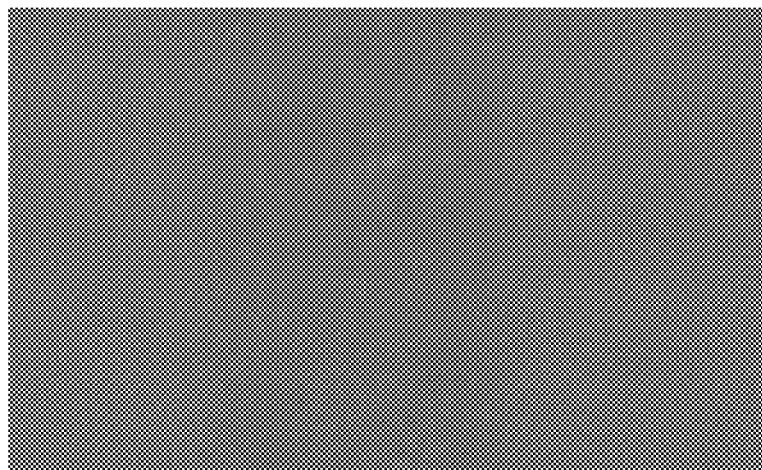
FIG. 8 shows a reflective performance test result of Example 2 of the present disclosure.
Figure 9:
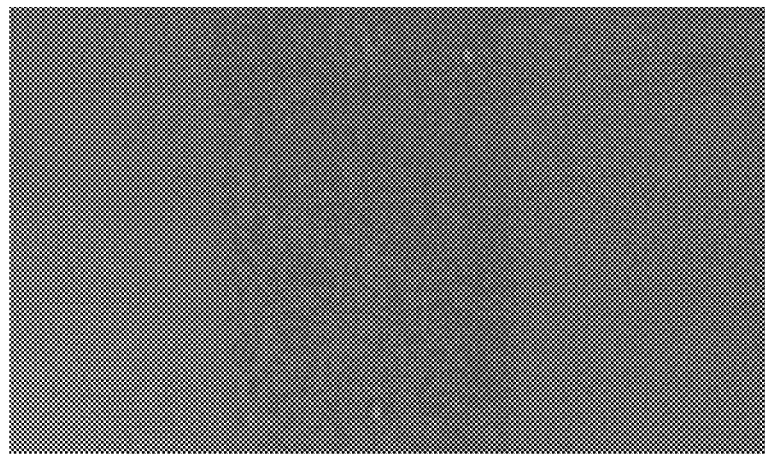
FIG. 9 shows a reflective performance test result of Example 3 of the present disclosure.
Figure 10:
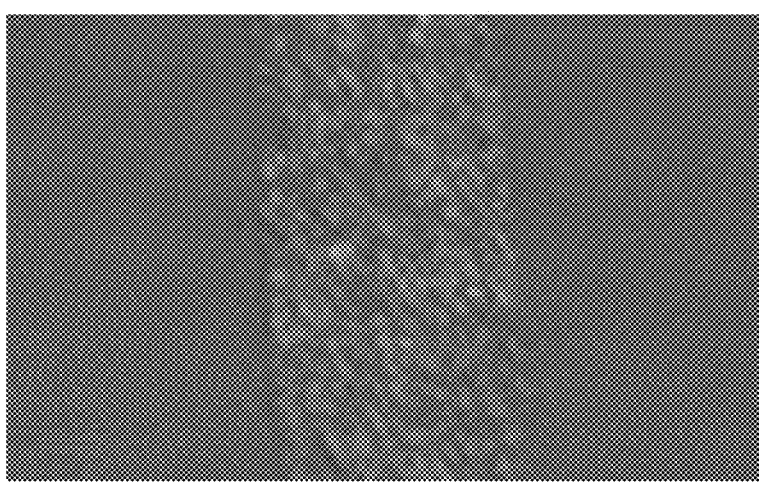
FIG. 10 shows a reflective performance test result of Example 4 of the present disclosure.
Figure 11:
FIG. 11 shows a retro-reflective performance test result of Example 3 of the present disclosure.
Figure 12:
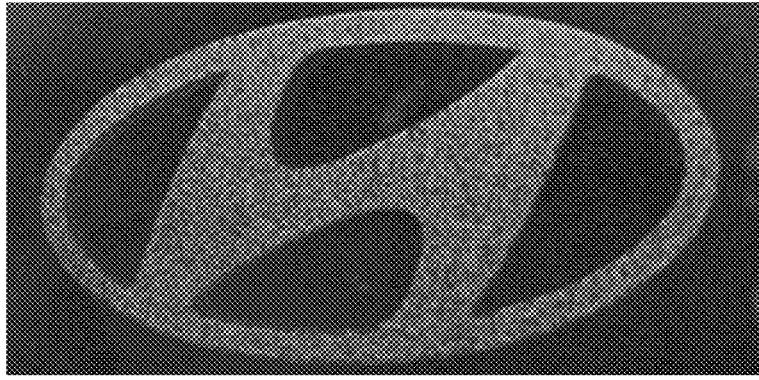
FIG. 12 shows a retro-reflective performance test result of Comparative Example 3 of the present disclosure.
Figure 13:
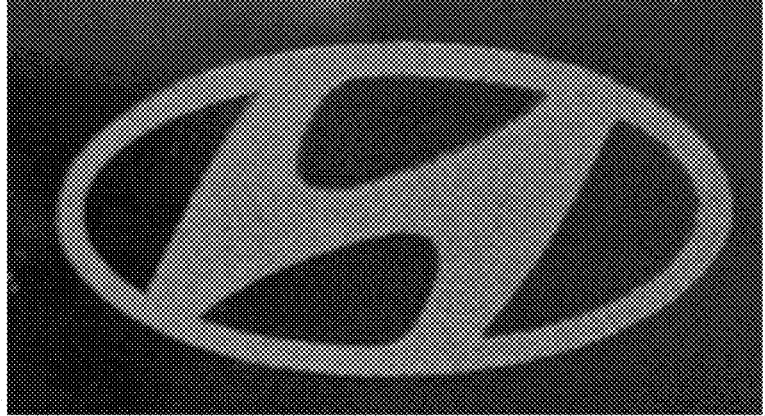
FIG. 13 shows a retro-reflective performance test result of Comparative Example 4 of the present disclosure.
Figure 14:
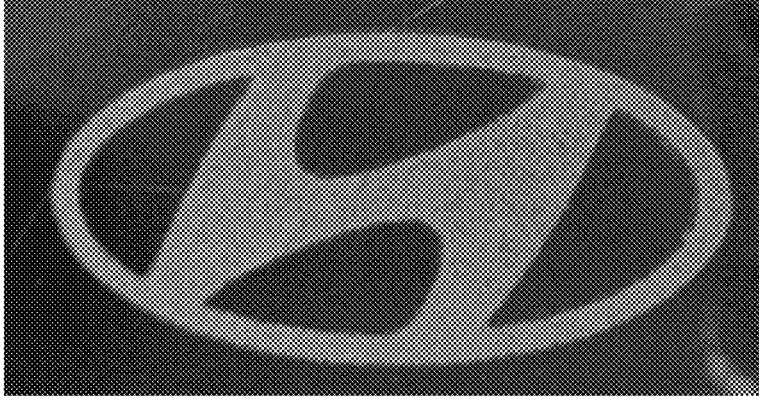
FIG. 14 shows a retro-reflective performance test result of Comparative Example 5 of the present disclosure.
Figure 15:
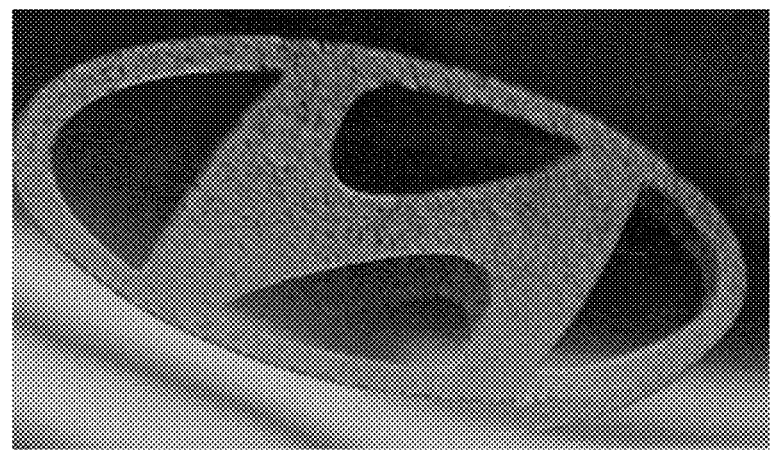
FIG. 15 shows a retro-reflective performance test result of Comparative Example 6 of the present disclosure.
Figure 16:
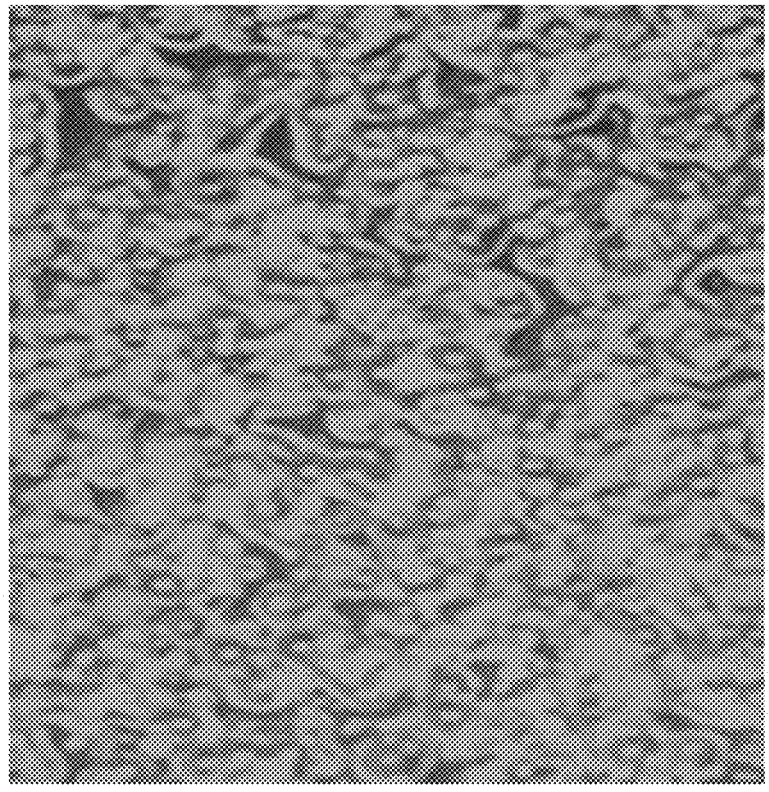
FIG. 16 shows an appearance and printability test result of Example 3 of the present disclosure.
Figure 17:
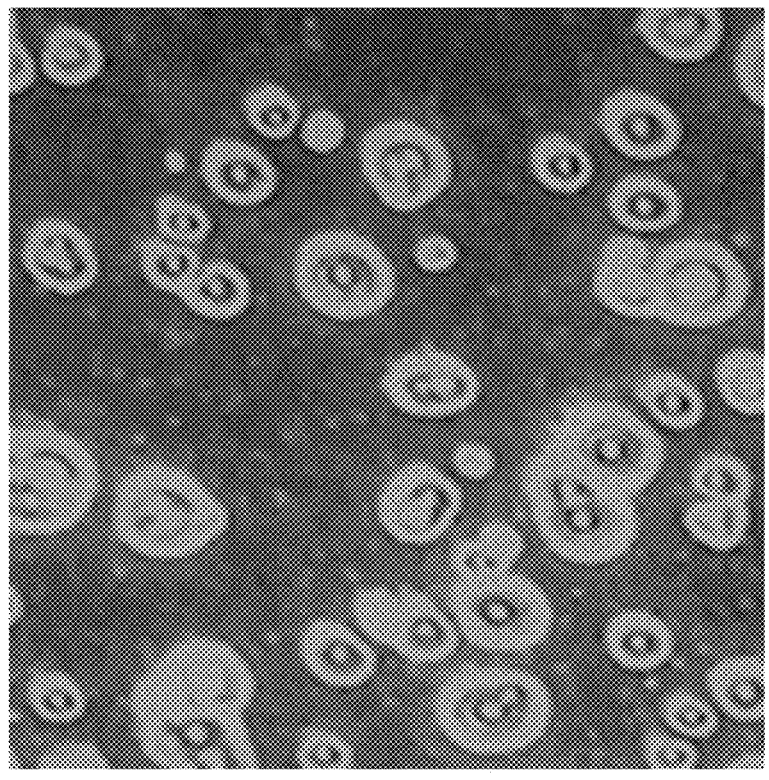
FIG. 17 shows an appearance and printability test result of Comparative Example 3 of the present disclosure.
Figure 18:
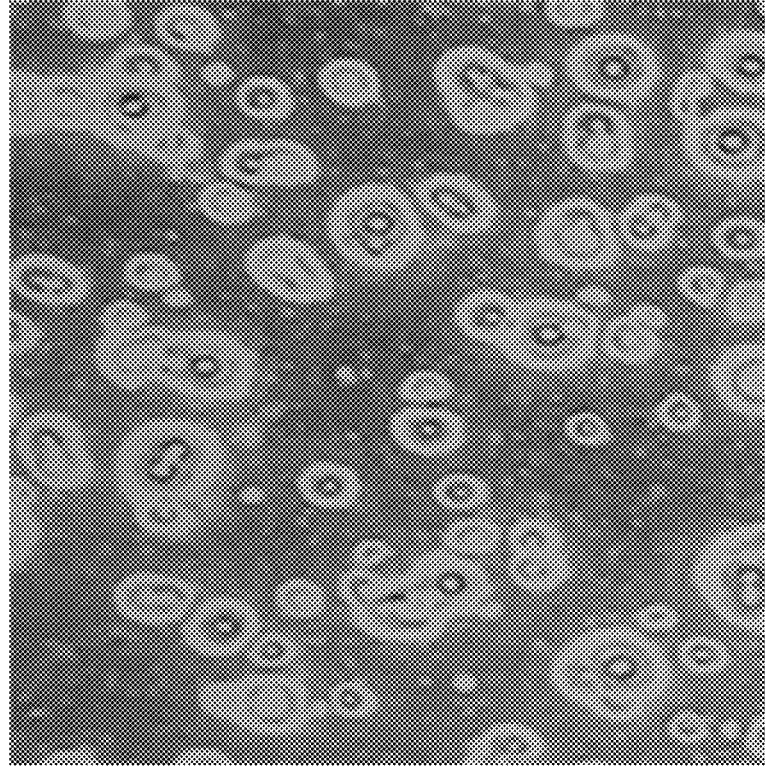
FIG. 18 shows an appearance and printability test result of Comparative Example 4 of the present disclosure.
Figure 19:
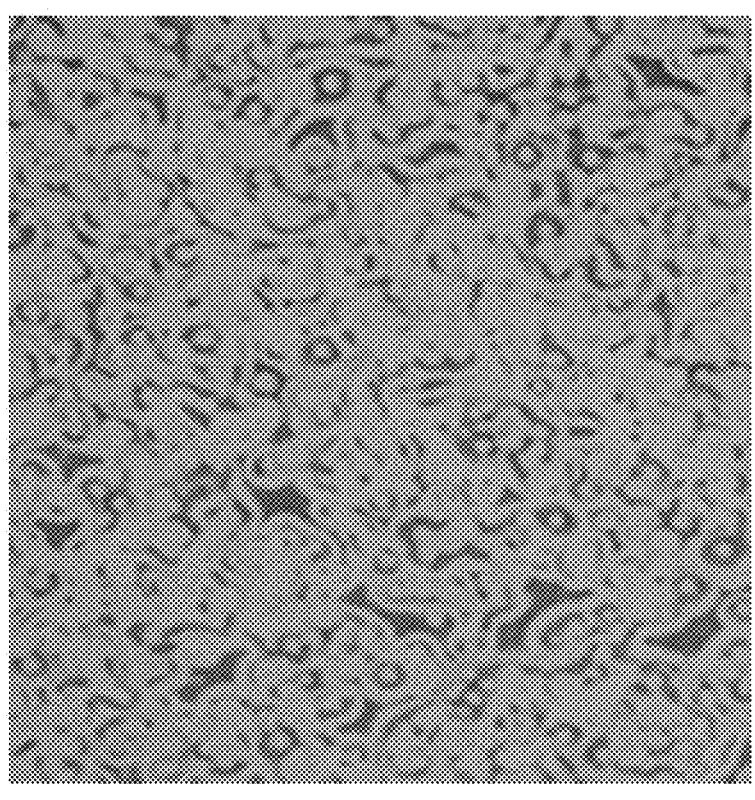
FIG. 19 shows an appearance and printability test result of Comparative Example 5 of the present disclosure.
Figure 20:
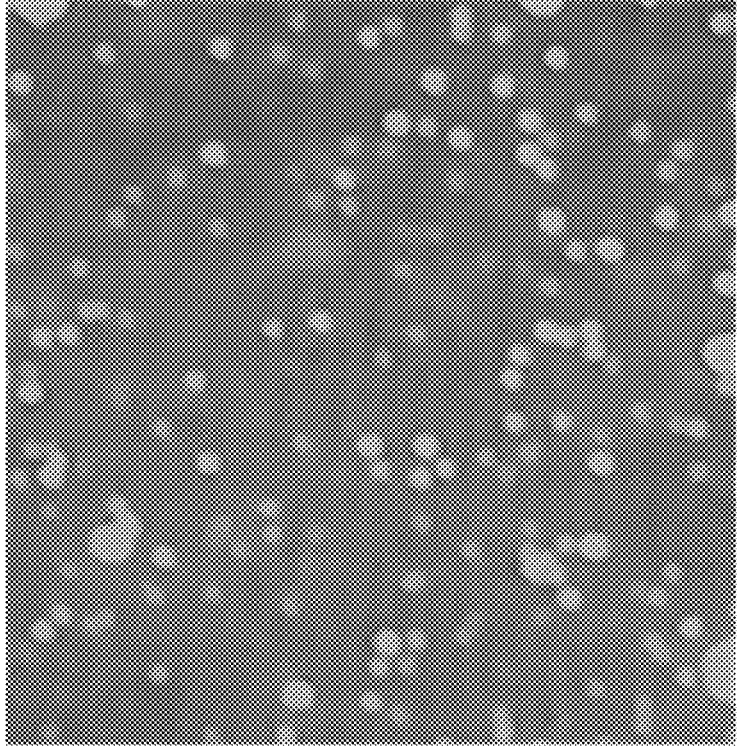
FIG. 20 shows an appearance and printability test result of Comparative Example 6 of the present disclosure.
Figure 21:
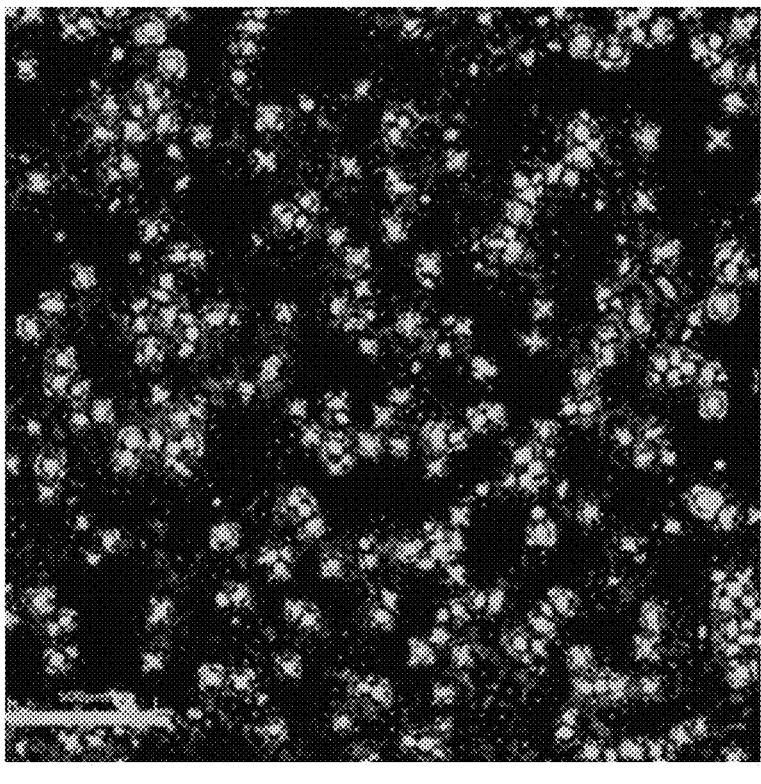
FIG. 21 shows a printability test result of Example 2 of the present disclosure.
Figure 22:
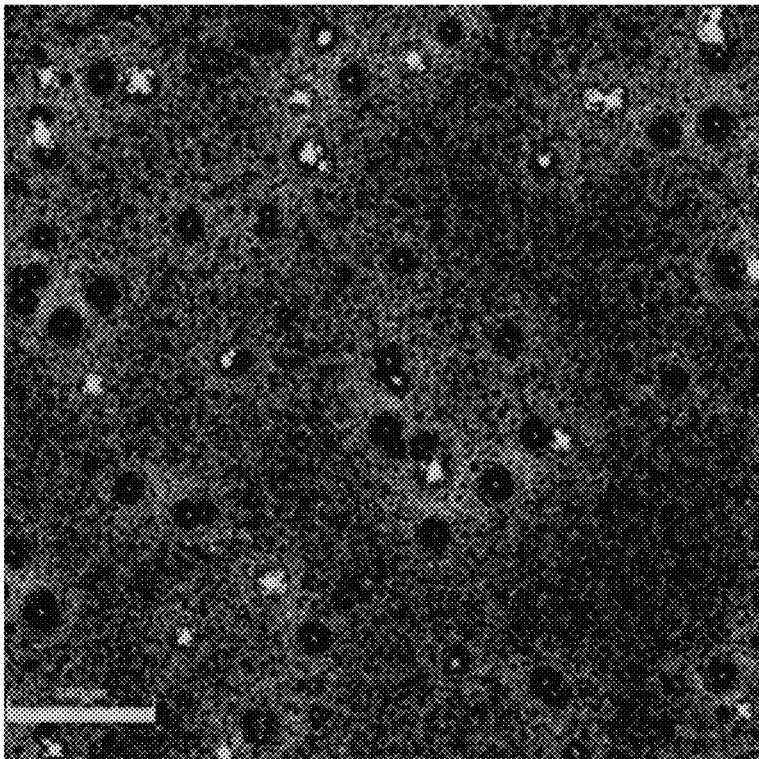
FIG. 22 shows a printability test result of Comparative Example 3 of the present disclosure.
Figure 23:
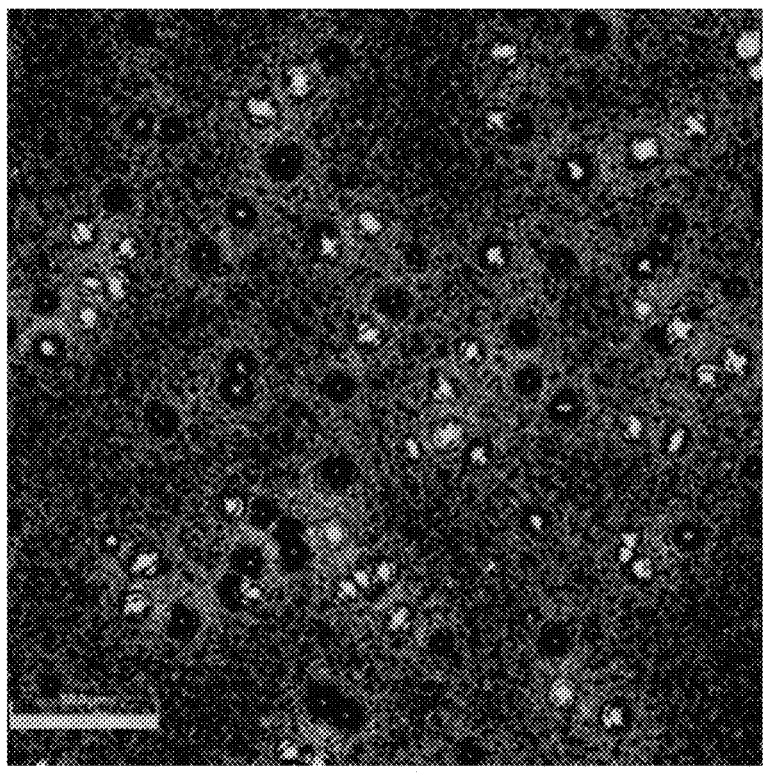
FIG. 23 shows a printability test result of Comparative Example 4 of the present disclosure.
Figure 24:
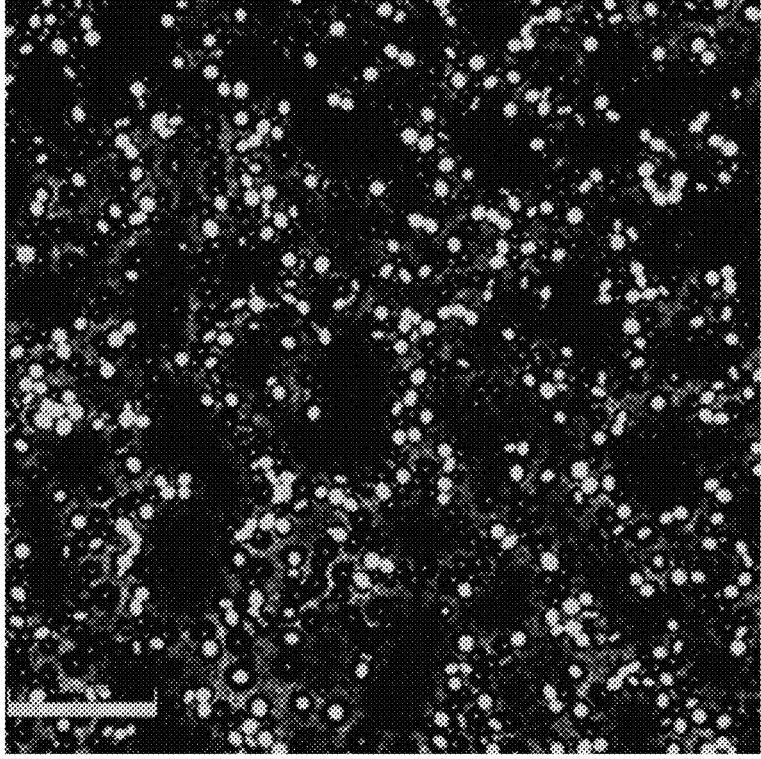
FIG. 24 shows a printability test result of Comparative Example 5 of the present disclosure.

As shown in FIG. 2B, a method of forming the coating film, according to an exemplary embodiment of the present disclosure, may include direct printing on the surface of a component. For example, the primer layer and the base layer may be painted on the substrate layer and then dried at a temperature in a range of about 50° C. to 100° C. for about 10 minutes to 30 minutes. Then, the ink layer may be printed in a specific pattern and then dried at a temperature in a range of about 50° C. to 100° C. for about 10 minutes to 30 minutes. Thereafter, the clear layer may be painted and then dried at a temperature in a range of about 50° C. to 100° C. for about 10 minutes to 30 minutes.

The base layer may include a plastic material or a metal material.

The painting, drying, and printing may be performed by any method commonly used.

The printing may be, for example, pad printing, silk printing, or screen printing.

For example, in the method of forming the coating film according to an exemplary embodiment of the present disclosure, the ink layer may be printed on the transparent film layer, laminated with the adhesive layer, and then attached to the clear layer.

For example, the primer layer and the base layer may be painted on the substrate layer and then dried at a temperature in a range of about 50° C. to 100° C. for about 10 minutes to 30 minutes. Next, the clear layer may be painted and then dried at a temperature in a range of about 50° C. to 100° C. for about 10 minutes to 30 minutes. Thereafter, the transparent film layer, the ink layer, and the adhesive layer may be printed on a carrier film and then attached to the clear layer.

The transparent film layer may include PET, PMMA, PC, and the like, and may have a thickness in a range of about 50 μm to 125 μm.

The adhesive layer may have a thickness in a range of about 10 μm to 50 μm.

EXAMPLE

Hereinafter, the present disclosure will be described in detail with reference to the following Examples and Comparative Examples. However, the spirit of the present disclosure is not limited thereto.

Examples 1 to 4 and Comparative Examples 1 to 8

Each ink composition was prepared with the composition shown in Table 1 below.

TABLE 1

| unit: wt % | Example | | | | Comparative Example | | | | | | | |
|---|---|---|---|---|---|---|---|---|---|---|---|---|
| | 1 | 2 | 3 | 4 | 1 | 2 | 3 | 4 | 5 | 6 | 7 | 8 |
| A | 25 | 25 | 25 | 25 | 45 | 35 | 25 | 25 | 25 | 25 | 25 | 25 |
| B | 10 | 10 | 10 | 10 | — | 10 | 10 | 10 | 10 | 10 | 10 | 10 |
| C | 10 | 10 | 10 | 10 | — | — | 10 | 10 | 10 | 10 | 10 | 10 |
| D | 5 | 5 | 5 | 5 | 5 | 5 | 5 | 5 | 5 | 5 | 5 | 5 |
| E-1 | 40 | — | — | — | — | — | — | — | — | — | — | — |
| E-2 | — | 40 | — | — | — | — | — | — | — | — | — | — |
| E-3 | — | — | 40 | — | 40 | 40 | 20 | 30 | 50 | 70 | 40 | 40 |
| E-4 | — | — | — | 40 | — | — | — | — | — | — | — | — |
| E-5 | — | — | — | — | — | — | — | — | — | — | — | — |
| F-1 | 1 | 1 | 1 | 1 | 1 | 1 | 1 | 1 | 1 | 1 | 1 | 1 |
| F-2 | 1 | 1 | 1 | 1 | 1 | 1 | 1 | 1 | 1 | 1 | 2 | 3 |
| G | 8 | 8 | 8 | 8 | 8 | 8 | 8 | 8 | 8 | 8 | 8 | 8 |

A: Acrylic resin (purchased from NOROO Holdings)
B: Acrylic polyol resin (purchased from NOROO Holdings)
C: Polyester polyol resin (Desmophen ® VP LS 2388 purchased from Covestro)
D: Curing agent (Desmodur N3800 (HDI trimer) purchased from Covestro)
E-1: Retro-reflective pigment (reflective powder purchased from iSuoChem having a diameter of 20 μm)
E-2: Retro-reflective pigment (reflective powder purchased from iSuoChem having a diameter of 30 μm)
E-3: Retro-reflective pigment (reflective powder purchased from iSuoChem having a diameter of 100 μm)
E-4: Retro-reflective pigment (reflective powder purchased from iSuoChem having a diameter of 200 μm)
E-5: Color pigment (white)
F-1: UV stabilizer (Tinuvin 400 purchased from BASF)
F-2: Anti-settling agent (CERAFAK 110 purchased from BYK)
G: Solvent (a mixed solvent of toluene and xylene (where a volume ratio of toluene to xylene is in a range of 1:1 to 5)

Experimental Example 1: Performance Evaluation

A variety of performance tests were performed on Examples 1 to 4 and Comparative Examples 1 to 8. The results thereof are shown in Table 2.

11

[Evaluation Method]

Print quality: a printed layer was visually observed, or surface mottling was evaluated using a microscope Heat resistance: color change and adhesive strength were evaluated after being left in a chamber at a temperature of 90° C. for 300 hours Weather resistance: color change and adhesive strength were evaluated with 2500 kJ/m² irradiation under the conditions of ISO 105 (Textile-Test for color fastness)

Impact resistance: a pendulum having a core diameter of 12.5 mm and a load of 500 g was dropped from a height of 20 cm, using a DuPont impact tester, to visually observe whether the coating film was cracked or not Storage stability: each ink composition was left at room temperature and a low temperature (−20° C.) for 14 days to examine whether the ink was cured or not and whether the pigment precipitated or not

TABLE 2

| Category | Example | | | | Comparative Example | | | | | | | |
|---|---|---|---|---|---|---|---|---|---|---|---|---|
| | 1 | 2 | 3 | 4 | 1 | 2 | 3 | 4 | 5 | 6 | 7 | 8 |
| Appearance | ◎ | ◎ | ◎ | Δ | ◎ | ◎ | Δ | ◎ | ◎ | Δ | ◎ | ◎ |
| Printability | ◎ | ◎ | ◎ | Δ | ◎ | ◎ | ◎ | ◎ | ○ | Δ | ○ | Δ |
| Print quality | ◎ | ◎ | ◎ | Δ | ◎ | ◎ | Δ | Δ | ◎ | Δ | ○ | ○ |
| Heat resistance | ◎ | ◎ | ◎ | ◎ | ◎ | ◎ | ◎ | ◎ | ◎ | ◎ | ◎ | Δ |
| Weather resistance | ○ | ○ | ○ | ○ | ◎ | ◎ | ○ | ○ | ○ | ○ | ○ | Δ |
| Impact resistance | ◎ | ◎ | ◎ | ◎ | ○ | ○ | ◎ | ◎ | ◎ | ◎ | ◎ | ○ |
| Retro-reflective performance (external light on) | X | Δ | ○ | ◎ | ○ | ○ | Δ | ○ | ○ | ○ | ○ | ◎ |
| Storage stability | ◎ | ◎ | ○ | Δ | ○ | ○ | ◎ | ◎ | ○ | ○ | ○ | Δ |

(◎: excellent, ○: good, Δ: insufficient)

Experimental Example 2: Performance Examination Depending on Diameter of Retro-Reflective Pigment Examples 1 to 4 were tested to compare the performance depending on the diameter of the retro-reflective pigment. The results thereof are shown in FIGS. 3 to 10.

FIGS. 3 to 6 show printability test results of Examples 1 to 4 of the present disclosure. FIGS. 7 to 10 show reflection performance test results of Examples 1 to 4 of the present disclosure.

As shown in FIGS. 3 to 10, the retro-reflective performance was improved as the diameter of the pigment increases. When the particle size was smaller than 20 μm, the printability and print quality were good, but the retro-reflective performance was poor. On the contrary, when the particle size was greater than 200 μm, the retro-reflective performance was excellent, but the print uniformity and print quality were poor, causing stains. This is because, the larger the particle size, the heavier the weight of the particles, so the pigment was contained in the resins in a small amount and thus failed to be uniformly applied on the entire printed area, which looks like a stain.

Experimental Example 3: Performance Examination Depending on Amount of Retro-Reflective Pigment Example 3 and Comparative Examples 3 to 6 were tested to compare the retro-reflective performance depending on the amount of the retro-reflective pigment. The results thereof are shown in FIGS. 11 to 20.

FIGS. 11 to 15 show retro-reflective performance test results of Example 3 and Comparative Examples 3 to 6 of the present disclosure. FIGS. 16 to 20 show external appearance and printability test results of Example 3 and Comparative Examples 3 to 6 of the present disclosure.

As shown in FIGS. 11 to 20, when the amount of the retro-reflective pigment was less than 20 wt %, the amount of light reflection is insufficient, resulting in poor visibility and appearance quality. Thus, the larger the amount of the pigment, the better the retro-reflective performance as well as the appearance and printability. However, in the case of Comparative Examples 5 and 6 in which the amount of the retro-reflective pigment was greater than 40 wt %, the amounts of the resins contained in the ink composition were reduced, resulting in a deterioration in printability (a decrease in the amount of the pigment transferred during pad printing causes stains). In addition, there was a problem in that storage stability was reduced (pigment precipitation occurs at low temperatures).

Experimental Example 4: Performance Examination Depending on Amount and Diameter of Retro-Reflective Pigment Example 2 and Comparative Examples 3 to 5 were tested to compare the retro-reflective performance depending on the amount and diameter of the retro-reflective pigment. The results thereof are shown in FIGS. 21 to 24.

FIGS. 21 to 24 show printability test results of Example 2 and Comparative Examples 3 to 5 of the present disclosure.

As shown in FIGS. 21 to 24, as the amount of the retro-reflective pigment, which appeared white in the photomicrograph, decreased, the pigment failed to spread uniformly, causing stains (mottling) in a printed layer. In addition, the retro-reflective performance also deteriorated as the amount of the retro-reflective pigment decrease.

Although the various exemplary embodiments of the present disclosure have been disclosed for illustrative purposes, those skilled in the art will appreciate that various modifications, additions, and substitutions are possible, without departing from the scope and spirit of the present disclosure as disclosed in the accompanying claims. Therefore, exemplary embodiments of the present disclosure have been described for illustrative purposes, and should not be construed as being restrictive.

What is claimed is:

1. An ink composition comprising:
an amount of about 10 wt % to 40 wt % of an acrylic resin;
an amount of about 5 wt % to 20 wt % of an acrylic polyol resin;
an amount of about 5 wt % to 20 wt % of a polyester polyol resin;
an amount of about 2 wt % to 30 wt % of a curing agent;
an amount of about 20 wt % to 40 wt % of a retro-reflective pigment; and
an amount of about 0.6 wt % to 3 wt % of an additive;
wherein wt % are based on the total weight of the ink composition.

2. The ink composition of claim 1 wherein the ink composition comprises an amount of about 5 wt % to 20% of one or more solvents based on the total weight of the ink composition.

3. The ink composition of claim 1, wherein the acrylic resin has a weight average molecular weight (Mw) in a range of about 1,000 g/mol to 15,000 g/mol.

4. The ink composition of claim 1, wherein the acrylic resin has a glass-transition temperature (Tg) in a range of about 5° C. to 10° C.

5. The ink composition of claim 1, wherein the acrylic polyol resin has a weight average molecular weight (Mw) in a range of about 1,000 g/mol to 5,000 g/mol.

6. The ink composition of claim 1, wherein the acrylic polyol resin has a hydroxyl value in a range of about 100 mgKOH/g to 150 mgKOH/g.

7. The ink composition of claim 1, wherein the polyester polyol resin has a weight average molecular weight (Mw) in a range of about 2,000 g/mol to 4,000 g/mol.

8. The ink composition of claim 1, wherein the polyester polyol resin has a hydroxyl value in a range of about 100 mgKOH/g to 150 mgKOH/g.

9. The ink composition of claim 1, wherein the curing agent comprises one or more selected from the group consisting of methylene diphenyl diisocyanate (MDI), 1,6-hexamethylene diisocyanate (HDI), p-phenylene diisocyanate (PPDI), toluene diisocyanate (TDI), 1,5-naphthalene diisocyanate (NDI), and isophorone diisocyanate (IPDI).

10. The ink composition of claim 1, wherein the retro-reflective pigment comprises one or more selected from the group consisting of silica ($SiO_2$)-based glass beads, strontium carbonate ($SrCO_3$)-based glass beads, and aluminum oxide ($Al_2CO_3$)-based glass beads.

11. The ink composition of claim 1, wherein the retro-reflective pigment has a spherical form and a diameter in a range of about 30 μm to 200 μm.

12. The ink composition of claim 1, further comprising an amount of about 0.1 wt % to 10 wt % of a color pigment, based on the total weight of the ink composition.

13. The ink composition of claim 1, wherein the additive comprises a UV stabilizer, an anti-settling agent, or combinations thereof.

14. The ink composition of claim 13, wherein the additive comprises:

an amount of about 0.5 wt % to 2 wt % of the UV stabilizer; and an amount of about 0.1 wt % to 1 wt % of the anti-settling agent, based on the total weight of the ink composition.

15. The ink composition of claim 1, wherein the solvent comprises one or more selected from the group consisting of toluene, xylene, methyl ethyl ketone (MEK), methyl isobutyl ketone (MIBK), and butyl acetate.

16. A coating film comprising:

a substrate layer;

a primer layer disposed on the substrate layer;

a base layer disposed on the primer layer;

a clear layer disposed on the base layer; and an ink layer interposed between the base layer and the clear layer, wherein the ink layer comprises the ink composition of claim 1.

17. The film of claim 16, wherein the ink layer has a thickness in a range of about 1 μm to 5 μm.

18. A coating film comprising:

a substrate layer;

a primer layer disposed on the substrate layer;

a base layer disposed on the primer layer;

a clear layer disposed on the base layer; and an ink layer disposed on the clear layer, wherein the ink layer comprises the ink composition of claim 1.

19. The film of claim 18, further comprising:

an adhesive layer interposed between the clear layer and the ink layer; and a transparent film layer disposed on the ink layer.

20. A vehicle comprising the coating film of claim 16.

* * * * *